United States Patent [19]

Leyrer et al.

[11] Patent Number: 5,354,720
[45] Date of Patent: Oct. 11, 1994

[54] REDUCTION IN THE QUANTITY OF $NO_x$ IN LEAN EXHAUST GAS OF MOTOR VEHICLE ENGINES

[75] Inventors: Jürgen Leyrer, Alzenau; Egbert Lox; Bernd Engler, both of Hanau, all of Fed. Rep. of Germany

[73] Assignee: Degussa Aktiengesellschaft, Frankfurt am Main, Fed. Rep. of Germany

[21] Appl. No.: 26,127

[22] Filed: Mar. 4, 1993

[30] Foreign Application Priority Data

Mar. 4, 1992 [DE] Fed. Rep. of Germany ....... 4206699

[51] Int. Cl.$^5$ .......................... B01J 29/22; B01J 35/04
[52] U.S. Cl. ........................ 502/64; 502/65; 502/66; 502/78
[58] Field of Search ................. 502/65, 66, 78, 64; 423/213.5, 239.2

[56] References Cited

U.S. PATENT DOCUMENTS

| | | | |
|---|---|---|---|
| 4,492,770 | 1/1985 | Blanchard et al. | 502/304 |
| 5,019,546 | 5/1991 | Murakami et al. | 423/213.5 |
| 5,053,378 | 10/1991 | Blanchard et al. | 423/213.5 |
| 5,116,586 | 5/1992 | Baacke et al. | 423/239 |
| 5,157,007 | 10/1992 | Domesle | 502/66 |
| 5,177,041 | 1/1993 | Huriuchi et al. | 502/66 |

FOREIGN PATENT DOCUMENTS

| | | |
|---|---|---|
| 0054472 | 6/1982 | European Pat. Off. . |
| 0149966 | 7/1985 | European Pat. Off. . |
| 0376025 | 7/1990 | European Pat. Off. . |
| 0427970 | 5/1991 | European Pat. Off. . |
| 0485180 | 5/1992 | European Pat. Off. . |
| 3642018 | 6/1987 | Fed. Rep. of Germany . |
| 3841990 | 6/1990 | Fed. Rep. of Germany . |
| 3830318 | 8/1990 | Fed. Rep. of Germany . |
| 3940758 | 6/1991 | Fed. Rep. of Germany . |
| 3635284 | 9/1991 | Fed. Rep. of Germany . |
| 0039592 | 3/1977 | Japan ..................... 502/66 |
| 01-127044 | 5/1989 | Japan . |
| 01-139144 | 5/1989 | Japan . |
| 2149317 | 6/1990 | Japan ................... 423/213.5 |
| WO90/00441 | 1/1990 | PCT Int'l Appl. . |

OTHER PUBLICATIONS

Brettschneider, "Berechnung des Luftverhaeltnisses λ von Luft-Kraftstoff-Gemischen und des Einflusses von Messfehlern auf λ" Bosch Techn., Berichte, 6, (1979), pp. 177–186.

Database WPI, Week 8926, Dewent Publications, Ltd., No. 89-188667 to Toyota, which relates to JP-A-1,127,044.

Database WPI, Week 8928, Derwent Publications, Ltd., No. 89-201843 to Toyota, which relates to JP-A-1,139,144.

*Primary Examiner*—Carl F. Dees
*Attorney, Agent, or Firm*—Beveridge, DeGrandi, Weilacher & Young

[57] ABSTRACT

A catalyst is described for reducing the quantity of nitrogen oxides in lean exhaust gas of motor vehicle engines. The catalyst contains, on a structure reinforcing body, a first catalytic coating of an aluminum oxide and/or cerium oxide of large surface area impregnated with a mixture of iridium and platinum as catalytically active noble metal components. A second catalytic coating including a zeolite of the mordenite type containing copper and/or iron is applied to the first coating layer.

18 Claims, No Drawings

REDUCTION IN THE QUANTITY OF NO$_x$ IN LEAN EXHAUST GAS OF MOTOR VEHICLE ENGINES

BACKGROUND OF THE INVENTION

This invention relates to a catalyst for the reduction of nitrogen oxides in lean exhaust gas of motor vehicle engines. The catalyst contains, on an inert structure reinforcing body, a first catalytic coating of aluminum oxide and/or cerium oxide with high surface area. The aluminum oxide and/or cerium oxide optionally may be stabilized with rare earth metals and/or silicon dioxide. This first catalytic coating layer acts as a carrier for the catalytically active noble metal components. A second catalytic coating of a zeolite is formed on the first coating layer.

The emission of the noxious substances carbon monoxide hydrocarbons and nitrogen oxides in internal combustion or Otto engines has been drastically reduced in recent years by means of controlled, three-way catalysts.

Three-way catalysts are capable of oxidizing carbon monoxide and hydrocarbons to the harmless compounds carbon dioxide and water, and at the same time, reducing nitrogen oxides to molecular nitrogen (see, e.g., German Patent No. 38 30 318, which is entirely incorporated herein by reference). The existence of a stoichiometric ratio of reducing and oxidizing components in the exhaust gas is a precondition for the satisfactory operation of three-way catalysts. This optimum ratio prevails when the "lambda number" or "air number" in the exhaust gas is equal to one. The air number lambda can be calculated, for example, from the various components in the exhaust gas by the Brettschneider formula (J. Brettschneider, Bosch Techn. Berichte 6 (1979) 177, which is entirely incorporated herein by reference).

Under real driving conditions, the air number for three-way catalysts must be constantly re-adjusted to the value 1 by a lambda control. For this purpose, the oxygen concentration in the exhaust gas is measured by a lambda probe, and the air-fuel ratio at the intake manifold of the engine is regulated so that the air number in the exhaust gas becomes equal to one.

However, this principle cannot be used for exhaust gas purification in diesel engines and so-called Otto lean engines. These engines always operate with a high oxygen excess which results in air numbers greater than one in the exhaust gas (lambda > 1).

"Diesel oxidation catalysts" as described, for example, in German Patent No. 39 40 758 (which is entirely incorporated herein by reference), have been developed for the purification of exhaust gases in diesel engines and lean engines. These catalysts have high conversion rates for the oxidation of carbon monoxide and hydrocarbons, but do not alter the nitrogen oxide content in the exhaust gas. A diminution in the nitrogen oxide content by reduction is difficult with these catalysts because of the high proportion of oxygen in the exhaust gas.

The reaction of nitrogen oxides with ammonia is described in German Patent Publication No. 36 35 284 (which is entirely incorporated herein by reference). Such a process is very difficult to employ in mobile sources of emission, because it requires an additional container for NH$_3$ and a complicated dosing device. Moreover, it would appear inadvisable for safety reasons to carry ammonia in vehicles.

Further, secondary emissions of unreacted ammonia (ammonia leakage) are liable to occur in this system due to higher than stoichiometric ammonia dosing. Furthermore, the temperatures required for high conversion rates of the nitrogen oxides are above 400° C. in this process.

Japanese Specification JP 1127044 describes a catalyst coating which is capable of oxidizing the carbon monoxide and hydrocarbons contained in the exhaust gas as well as substantially reducing the nitrogen oxides to nitrogen, in spite of the oxidizing exhaust gas conditions. This document is entirely incorporated herein by reference. The coating is a double coating having a first catalytic layer for the catalysis of oxidation reactions and a second layer of zeolite applied to the first layer. In a further step of the coating process, copper is applied as an active component to the second layer.

The first layer may consist of aluminum oxide and an oxide of a rare earth metal, e.g., cerium oxide, and is impregnated with one or more metals from the group of platinum, palladium and rhodium. After impregnation of the first layer with the noble metals, the second layer, consisting of zeolite and silica gel, is applied. Only then is the catalyst charged with copper by immersion of the entire preliminary catalyst in an aqueous copper acetate solution for 24 hours.

Although this catalyst known in the art converts the noxious substance NO$_x$ at exhaust gas temperatures in the range of 500° to 600° C., these temperatures are substantially above the temperatures of 225° to 400° C. typically occurring in exhaust gas, in particular from diesel engines. Data for the relevant exhaust gas temperature range for diesel engines in the range of 225° to 400° C. is not given in the Japanese Specification JP 1127044. Moreover, the subsequent impregnation of the whole carrier does not ensure that copper is deposited only on the zeolite and not on the aluminum oxide, as can be seen from the quantity of copper given in the Japanese Specification, which is 20 grams per liter of carrier volume. This is an extremely large quantity and exceeds the maximum exchange capacity of the zeolite. Further, homogeneous distribution of the copper over the monolith, in particular in the channels of the honeycomb, does not appear to be ensured by this step of the process.

Impregnation of the zeolite with copper is also very expensive and time consuming (24 hours according to the Japanese Specification).

SUMMARY OF THE INVENTION

It is an object of the present invention to provide a catalyst for reducing the amount of nitrogen oxides in lean exhaust gas of motor vehicle engines, wherein the catalyst has comparatively high conversion rates for the noxious substances carbon monoxide and hydrocarbons, as well as for nitrogen oxides, at exhaust gas temperatures as low as 225° C. It is a further object of this invention that the catalyst be produced by a simple and efficient process.

DETAILED DESCRIPTION OF THE INVENTION

In achieving the above and other objects, one feature of the invention resides in a catalyst having two catalytically active layers. The first catalyst coating layer may be aluminum oxide and/or cerium oxide having a large surface area. This first layer, optionally, may be stabilized with rare earth metals and/or silicon dioxide. This first catalytic layer acts as a carrier for the catalytically active noble metal components. A second catalytic coating layer of a zeolite is formed on the first layer. The catalyst is characterized in that the noble metal components of the first catalytic layer are iridium and platinum in a ratio by weight in the range of from 1:10 to 10:1, preferably 1:2. The zeolite is a temperature stable zeolite of the mordenite type containing copper and/or iron.

The catalyst according to the invention is distinguished by exceptionally high conversion rates for the noxious substances at temperatures as low as 225° to 400° C. Therefore, the catalyst advantageously may be used for the exhaust gas purification of diesel engines. It is capable of reducing nitrogen oxides to nitrogen even at the high oxygen content found in diesel exhaust gases and the exhaust gases of Otto engines driven under lean conditions. This advantageous effect is due, inter alia, as will be shown, to the combination according to the invention of iridium and platinum in the first catalytic layer.

The choice of a temperature stable zeolite of the mordenite type ensures a positive influence on the aging characteristics of the catalyst. The combination of the sub-group metals copper and iron introduced into the zeolite provides for optimized catalytic activity for the conversion of the noxious substances carbon monoxide, hydrocarbons and nitrogen oxides.

Silicon dioxide may be used for stabilizing the $\gamma$-aluminum oxide. Optimum stabilization is achieved when the silicon dioxide is present in a quantity of more than 0.1% by weight, preferably from 0.1 to 15% by weight, in particular from 4.5 to 11.5% by weight, based on the $\gamma$-aluminum oxide.

Zeolites of the mordenite type having an $SiO_2:Al_2O_3$ molar ratio above 8, preferably from 10 to 50, and in particular from 15 to 30, are particularly suitable for use in accordance with the invention. These high $SiO_2:Al_2O_3$ molar ratios impart good temperature stability to the zeolites. The zeolites may be charged with the sub-group elements copper and iron within their ion exchange capacity. Particularly advantageous effects on the activity of the completed catalyst are obtained when the total quantity of the sub-group elements, based on the weight of the zeolite, is from 0.1 to 13% by weight, and preferably from 1.0 to 7.0% by weight. The copper content should be in the range of from 0.5 to at most 5.5% by weight (based on the weight of the zeolite), and/or the iron content should be at least 0.5% by weight and at most 7.5% by weight (based on the weight of the zeolite).

The catalytic coatings are advantageously applied to structure reinforcing bodies made of ceramic or metal, preferably in monolithic or honeycomb form (carrier catalysts). These monoliths are well known in the art, and any suitable ones can be used for this invention. The quantity of each of the two coatings should be in the range of from 50 to 150 grams per liter of catalyst volume.

The invention also relates to a process for reducing the quantity of nitrogen oxides in the lean exhaust gas of motor vehicle engines. This process includes employing a catalyst according to the invention in the exhaust gas purification. The exhaust gas contacts the catalyst in a manner familiar to those skilled in the art.

The invention will now be illustrated in more detail with the aid of the following Examples. The Examples are intended to illustrate the invention and should not be construed as limiting the same. The catalyst bodies used were honeycomb bodies of cordierite having 62 cells/cm$^2$ and a cell wall thickness of 0.17 mm.

EXAMPLE 1—Comparison Catalyst VK1.

For preparing the comparison catalyst VK1, according to Japanese Specification JP 1127044, a catalyst body was first covered with an oxide layer of high surface area in a quantity of 80 g/l of catalyst volume by immersion in an aqueous suspension (25% solids content) of $\gamma$-aluminum oxide (BET surface area 140 m$^2$/g). After the catalyst body had been dried at 120° C. and calcined for 2 hours at 600° C., the oxide layer was impregnated by immersion in an aqueous $PdCl_2$ solution. After 2 hours of tempering in air at 550° C., the noble metal salt was finally reduced in a stream of $H_2$ for 3 hours at 550° C.

In a further step, an aqueous suspension of an H-mordenite $SiO_2/Al_2O_3$ molar ratio 25:1) was prepared from 90% H-mordenite and 10% of a silica gel. This suspension was applied to the first layer in a quantity of 80 grams of solid per liter of catalyst volume, again by immersion coating. After the catalyst had been dried again at 120° C. and calcined for two hours at 550° C., the H-mordenite was impregnated with copper for 24 hours in a 0.02 mol/l of copper acetate solution. The catalyst was again dried for 2 hours at 300° C.

The comparison catalyst VK1 thus prepared was coated with 1.76 grams of palladium and 12.6 grams of copper per liter of catalyst volume.

EXAMPLE 2—Catalyst K1

A catalyst body was first covered as in Example 1 with an aluminum oxide layer of large surface area in a quantity of 80 g/l of catalyst volume. This was followed by drying in air at 120° C. and calcining of the carrier in air at 550° C. for 2 hours. The aluminum oxide layer was then impregnated with iridium and platinum in a ratio by weight of 1:2 by immersion in an aqueous solution of $ItCl_3$ and $H_2PtCl_6$. This was followed by 2 hours of calcining in air at 550° C. The noble metal salts deposited on the carrier material were finally reduced in an $H_2$ stream at a temperature of 550° C. for 3 hours.

In a further step, a second catalytic layer of Cu/Fe mordenite was applied to the first catalytic layer in a quantity of 80 grams of Cu/Fe mordenite per liter of catalyst volume. Coating was again carried out by immersion of the catalyst body in an aqueous suspension of 95% of Cu/Fe mordenite and 5% of bentonite. The solids content of the suspension was about 35%. The catalyst was then dried at 120° C. and calcined for two hours at 550° C.

The physical-chemical data of the Cu/Fe mordenites employed may be seen from Table 1.

TABLE 1

| Physical-Chemical Data of the Fe Mordenite Employed | |
|---|---|
| Chemical analysis: | |
| $Na_2O$ | 0.49% by weight |
| $Al_2O_3$ | 5.4% by weight |
| $SiO_2$ | 74.0% by weight |
| CuO | 1.1% by weight |
| $Fe_2O_3$ | 1.2% by weight |
| Molar ratio $SiO_2:Al_2O_3$ | 23.3:1 |
| Loss on annealing (1000° C.) | 13% |
| Additives | 5% bentonite |

TABLE 1-continued

Physical-Chemical Data of the Fe Mordenite Employed

| | |
|---|---|
| Specific surface area | 475 m²/g |
| Micropore volume | 0.21 ml/g |
| Mesopore volume | 0.03 ml/g |
| Macropore volume | 1.36 ml/g |
| Total pore volume | 1.60 ml/g |
| Average particle size | 11.8 μm |

EXAMPLE 3—Catalyst K2

Catalyst K2 was prepared analogously to catalyst K1 in Example 2, but in contrast to Example 2, the noble metal components were added directly to the aluminum oxide suspension. This measure enables the intermediate calcining step to be omitted.

EXAMPLE 4—Comparison Catalyst VK2

Comparison catalyst VK2 was prepared analogously to catalyst K1 of Example 2, but in contrast to Example 2, the noble metal component consisted entirely of $H_2PtCl_6$.

EXAMPLE 5—Comparison Catalyst VK3

Comparison catalyst VK3 was prepared analogously to catalyst K1 of Example 2. In contrast to Example 2, however, the noble metal component consisted entirely of $IrCl_3$.

EXAMPLE 6—Catalyst K3

Catalyst K3 was also prepared analogously to catalyst K1 of Example 2, but in contrast to Example 2, the noble metal components used were $IrCl_3$ and $H_2PtCl_6$ in a ratio by weight of 10:1.

EXAMPLE 7—Catalyst K4

Catalyst K4 was also prepared analogously to catalyst K1 of Example 2, but in contrast to Example 2, however, the noble metal components $IrCl_3$ and $H_2PtCl_6$ were used in the ratio by weight of 1:10.

EXAMPLE 8—Catalyst K5

Catalyst K5 was also prepared analogously to catalyst K1 of Example 2. In contrast to Example 2, however, the zeolite used was a mordenite having a Cu content of 1.7% by weight, without iron.

EXAMPLE 9—Catalyst K6

Catalyst K6 was also prepared analogously to catalyst K1 of Example 2. In contrast to Example 2, however, the zeolite employed was a mordenite having an Fe content of 1.5% by weight, without copper.

EXAMPLE 10—Catalyst K7

Catalyst K7 was also prepared analogously to catalyst K1 of Example 2. In contrast to Example 2, however, an aluminum oxide which had been stabilized with 10% by weight of $SiO_2$ was used in the first oxidic coating.

EXAMPLE 11—Catalyst K8

Catalyst K8 was also prepared analogously to catalyst K1 of Example 2. In contrast to Example 2, a cerium oxide was employed in the first oxidic coating.

The exact compositions of the various individual catalysts are shown in Table 2.

TABLE 2

| | Composition of the Catalyts | | | | | | | | |
|---|---|---|---|---|---|---|---|---|---|
| | 1st Layer | | | | | | 2nd Layer | | |
| Catalyst | $Al_2O_3$ (g/l) | $CeO_2$ (g/l) | $SiO_2$ (g/l) | Pd (g/l) | Pt (g/l) | Ir (g/l) | Zeolite (g/l) | Cu (g/l) | Fe (g/l) |
| VK 1 | 80 | — | — | 1.76 | — | — | 80 | 12.6 | — |
| K 1 | 80 | — | — | — | 1.17 | 0.59 | 80 | 0.88 | 0.96 |
| K 2 | 80 | — | — | — | 1.17 | 0.59 | 80 | 0.88 | 0.96 |
| VK 2 | 80 | — | — | — | 1.76 | — | 80 | 0.88 | 0.96 |
| VK 3 | 80 | — | — | — | — | 1.76 | 80 | 0.88 | 0.96 |
| K 3 | 80 | — | — | — | 0.16 | 1.60 | 80 | 0.88 | 0.96 |
| K 4 | 80 | — | — | — | 1.60 | 0.16 | 80 | 0.88 | 0.96 |
| K 5 | 80 | — | — | — | 1.17 | 0.59 | 80 | 1.36 | — |
| K 6 | 80 | — | — | — | 1.17 | 0.59 | 80 | — | 1.20 |
| K 7 | 72,0 | — | 8,0 | — | 1.17 | 0.59 | 80 | 0.88 | 0.96 |
| K 8 | — | 80 | — | — | 1.17 | 0.59 | 80 | 0.88 | 0.96 |

EXAMPLE 12—Activity Test

The catalytic activities of exhaust gas purification catalysts of Examples 1 to 11 were determined on a model gas test installation in the fresh state and after 16 hours aging. Aging was carried out by tempering the catalysts in air at 750° C. in a furnace.

The exhaust gas composition used for the activity test is shown in Table 3. It consists of a lean exhaust gas having a high oxygen content of 6 vol. %. The air number lambda calculated from the Brettschneider formula is 1.35 for this exhaust gas composition.

TABLE 3

| Exhaust Gas Composition with Air Number 1.35 | |
|---|---|
| Exhaust gas components | Concentration |
| $CO_2$ | 10.7 (vol. %) |
| CO | 350 (ppm) |
| $H_2$ | 177.2 (ppm) |
| NO | 270 (ppm) |
| $C_3H_6$ | 800 (ppm) |
| $O_2$ | 6 (vol. %) |
| $H_2O$ | 10 (vol. %) |
| $N_2$ | Balance |

For the activity tests, the conversion of carbon monoxide, hydrocarbons and nitrogen oxides was measured as a function of the exhaust gas temperature in front of the catalysts at volumetric velocities of 50,000 h⁻¹.

The results of the activity tests are summarized in Tables 4 and 5. These results shown that catalyst K1 according to the invention has considerable advantages compared with VK1 of the state of the art, in particular in the exhaust gas temperature range of from 225° to 350° C., which is relevant for diesel engines and Otto engines operated under lean conditions. These advantages are not limited to the conversion of nitrogen oxides NO$_x$, but are also found for the conversion of carbon monoxide (CO) and hydrocarbons (HC). Whereas the catalyst according to the invention (K1) reaches its full conversion power at exhaust gas temperatures of only 225° C., the comparison catalyst (VK1) shows hardly any activity at this temperature. It is only at 350° C. that the comparison catalyst VK1 approximates the performance of the catalyst according to the invention for the noxious substances CO and HC, while the conversion of NO$_x$ is still far below that of the catalyst according to the invention.

TABLE 4

Conversion of Noxious Substances by Fresh Catalysts

| | Temperature in front of catalyst | | | | | | | | | | | |
|---|---|---|---|---|---|---|---|---|---|---|---|---|
| | 225° C. | | | 275° C. | | | 325° C. | | | 350° C. | | |
| Catalyst | CO | HC | NO$_x$ | CO | HC | NO$_x$ | CO | HC | NO$_x$ | CO | HC | NO$_x$ |
| VK | 1 | 1 | 0 | 1 | 5 | 1 | 81 | 93 | 21 | 94 | 100 | 22 |
| K 1 | 93 | 49 | 35 | 97 | 100 | 40 | 96 | 100 | 41 | 97 | 100 | 34 |
| K 2 | 94 | 50 | 33 | 98 | 100 | 42 | 97 | 100 | 40 | 98 | 100 | 37 |
| VK 2 | 91 | 99 | 49 | 97 | 100 | 20 | 98 | 100 | 7 | 97 | 100 | 6 |
| VK 3 | 0 | 5 | 4 | 1 | 8 | 7 | 46 | 97 | 25 | 75 | 96 | 28 |
| K 3 | 41 | 3 | 2 | 73 | 55 | 14 | 97 | 100 | 17 | 97 | 100 | 10 |
| K 4 | 88 | 85 | 31 | 96 | 100 | 7 | 98 | 100 | 9 | 98 | 100 | 5 |
| K 5 | 67 | 24 | 17 | 85 | 89 | 24 | 94 | 99 | 17 | 95 | 100 | 18 |
| K 6 | 77 | 23 | 17 | 83 | 68 | 31 | 93 | 97 | 28 | 97 | 100 | 4 |
| K 7 | 93 | 99 | 77 | 97 | 100 | 26 | 98 | 100 | 20 | 100 | 100 | 17 |
| K 8 | 86 | 32 | 25 | 90 | 97 | 31 | 97 | 100 | 38 | 97 | 100 | 30 |

TABLE 5

Conversion of Noxious Substances by Aged Catalysts (16 h, 750° C., in air)

| | Temperature in front of catalyst | | | | | | | | | | | |
|---|---|---|---|---|---|---|---|---|---|---|---|---|
| | 225° C. | | | 275° C. | | | 325° C. | | | 350° C. | | |
| Catalyst | CO | HC | NO$_x$ | CO | HC | NO$_x$ | CO | HC | NO$_x$ | CO | HC | NO$_x$ |
| VK 1 | 0 | 1 | 0 | 1 | 2 | 2 | 28 | 45 | 5 | 55 | 95 | 11 |
| K 1 | 91 | 45 | 25 | 95 | 98 | 30 | 96 | 100 | 17 | 97 | 100 | 17 |
| K 2 | 90 | 50 | 26 | 96 | 99 | 29 | 98 | 100 | 20 | 98 | 100 | 20 |
| VK 2 | 91 | 88 | 47 | 96 | 98 | 18 | 98 | 100 | 4 | 96 | 100 | 3 |
| VK 3 | 0 | 0 | 0 | 8 | 8 | 6 | 75 | 40 | 15 | 50 | 91 | 25 |
| K 3 | 34 | 3 | 0 | 61 | 35 | 8 | 89 | 98 | 7 | 93 | 98 | 10 |
| K 4 | 88 | 85 | 31 | 96 | 100 | 7 | 98 | 100 | 9 | 98 | 100 | 5 |
| K 5 | 70 | 19 | 8 | 85 | 59 | 18 | 96 | 99 | 14 | 97 | 100 | 11 |
| K 6 | 52 | 4 | 6 | 77 | 54 | 18 | 93 | 96 | 16 | 96 | 99 | 6 |
| K 7 | 89 | 92 | 67 | 98 | 100 | 22 | 96 | 100 | 17 | 100 | 100 | 12 |
| k 8 | 77 | 31 | 15 | 86 | 91 | 22 | 93 | 88 | 32 | 98 | 100 | 26 |

These excellent properties result from the combination according to the invention of the two noble metal components iridium and platinum in the first catalytic layer with the Cu/Fe mordenite of the second catalytic layer.

The combination of the sub-group elements copper and iron also shows significant advantages with respect to the conversion of the noxious components carbon monoxide, hydrocarbons and nitrogen oxide.

Comparison catalyst VK2, containing only platinum as the noble metal component in the first catalytic layer, shows a decreasing conversion rate for nitrogen oxides with increasing exhaust gas temperature. Comparison catalyst VK3, containing only iridium in the first layer, shows an increasing conversion rate for nitrogen oxides with increasing exhaust gas temperature. The combination of the two noble metal components in the catalysts K1 to K8 according to the invention results in high conversion rates for nitrogen oxides, relatively independent of the exhaust gas temperature under the given lean exhaust gas conditions. Thus, these catalysts are eminently suitable for the exhaust gas purification of diesel engines and lean-operated Otto engines.

While the invention has been described in conjunction with various specific examples, those skilled in the art will recognize that various modifications can be made without departing from the spirit and scope of the invention as set forth in the claims.

The priority document, German Patent Application No. P 42 06 699.9, filed in Germany on Mar. 4, 1992, is relied on and entirely incorporated herein by reference.

We claim:

1. A catalyst for reducing a quantity of nitrogen oxides in lean exhaust gas of motor vehicle engines, comprising:

an inert, structure reinforcing body;

a first catalytic coating on said body, the coating including aluminum oxide and/or cerium oxide of large surface area, optionally stabilized with rare earth metals and/or silicon dioxide, as a carrier for catalytically active noble metal components and noble metals including at least platinum and iridium; and a second catalytic coating of zeolite on the first catalytic coating;

wherein the noble metal components of the first catalytic layer include iridium and platinum in a ratio by weight of from 1:10 to 10:1, and wherein the zeolite is a temperature stable zeolite of mordenite containing copper and/or iron, wherein the zeolite has an SiO$_2$: Al$_2$O$_3$ molar ratio in the range of 10–50.

2. A catalyst according to claim 1, wherein aluminum oxide and silicon dioxide are present, and the total SiO$_2$ content of the stabilized aluminum oxide is greater than 0.1% by weight, based on the aluminum oxide weight.

3. A catalyst according to claim 2, wherein the total SiO$_2$ content is in the range of 0.1 to 15% by weight, based on the aluminum oxide weight.

4. A catalyst according to claim 2, wherein the total SiO$_2$ content is in the range of 4.5 to 11.5% by weight, based on the aluminum oxide weight.

5. A catalyst according to claim 1, wherein the SiO$_2$:Al$_2$O$_3$ molar ratio is in the range of 15-30.

6. A catalyst according to claim 1, wherein the zeolite is charged with the elements copper and/or iron within its ion capacity.

7. A catalyst according to claim 6, wherein the zeolite contains a total of from 0.1 to 3.0% by weight copper and/or iron, based on the weight of the zeolite.

8. A catalyst according to claim 6, wherein the zeolite contains a total of from 1.0 to 7.5% by weight copper and/or iron, based on the weight of the zeolite.

9. A catalyst according to claim 7, wherein the zeolite contains at least 0.5% by weight and at most 5.5% by weight of copper, based on the weight of the zeolite.

10. A catalyst according to claim 8, wherein the zeolite contains at least 0.5% by weight and at most 5.5% by weight of copper, based on the weight of the zeolite.

11. A catalyst according to claim 7, wherein the zeolite contains at least 0.5% by weight and at most 7.5% by weight of iron, based on the weight of the zeolite.

12. A catalyst according to claim 8, wherein the zeolite contains at least 0.5% by weight and at most 7.5% by weight of iron, based on the weight of the zeolite.

13. A catalyst according to claim 1, wherein the structure reinforcing body is a ceramic or metallic carrier.

14. A catalyst according to claim 1, wherein the structure reinforcing body is a monolithic honeycomb carrier.

15. A catalyst according to claim 13, wherein both the first catalytic coating and the second catalytic coating are applied in a quantity in the range of from 50-150 grams per liter of catalyst volume.

16. A catalyst according to claim 14, wherein both the first catalytic coating and the second catalytic coating are applied in a quantity in the range of from 50-150 grams per liter of catalyst volume.

17. A catalyst according to claim 1, wherein the aluminum oxide and/or cerium oxide is formed into a layer on the structure reinforcing body, and then this layer is impregnated with noble metals.

18. A catalyst according to claim 1, wherein the aluminum oxide and/or cerium oxide and the noble metals are formed into a suspension, and the suspension forms the first coating on the structure reinforcing body.

* * * * *